Figure 1:
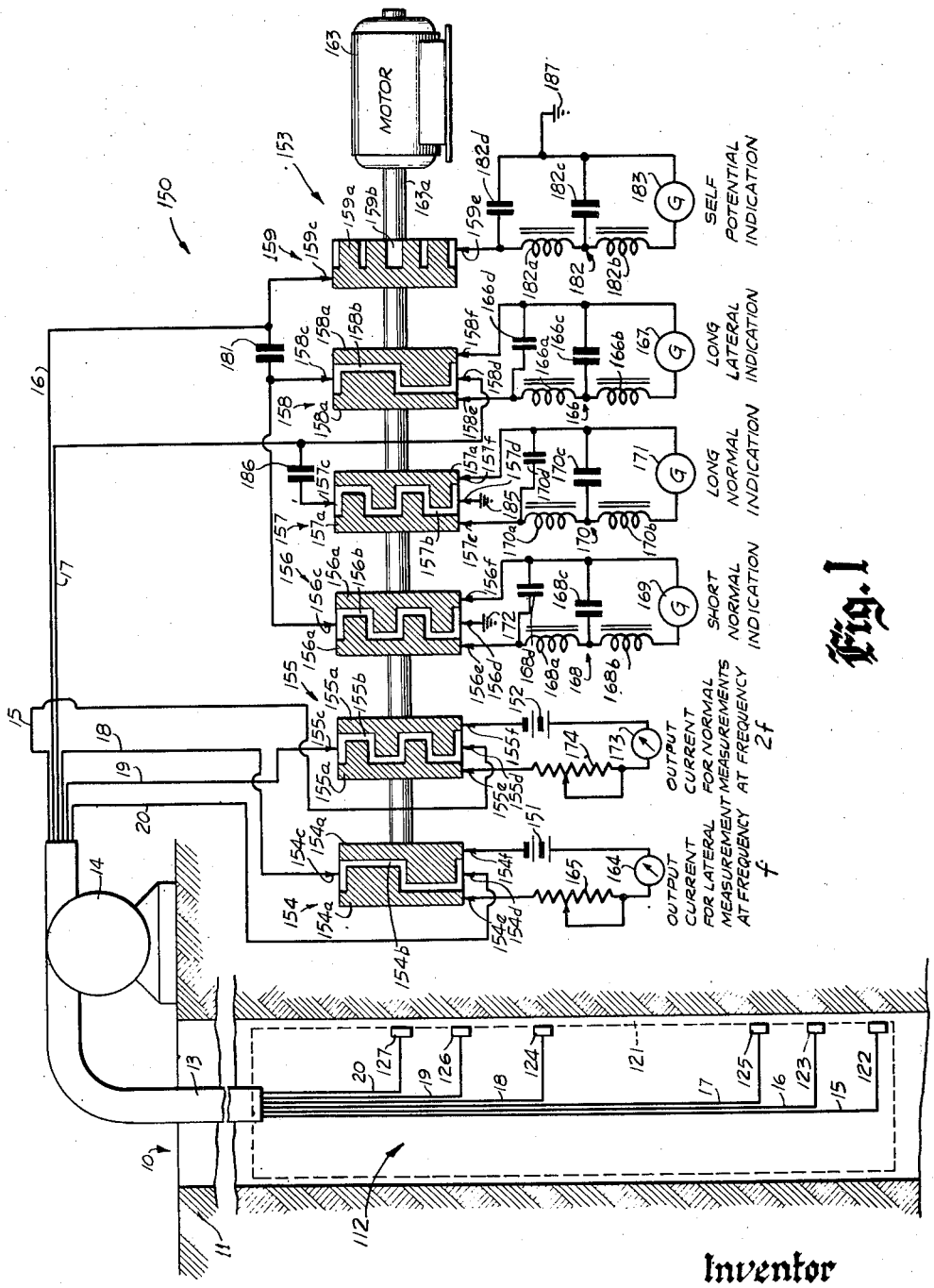

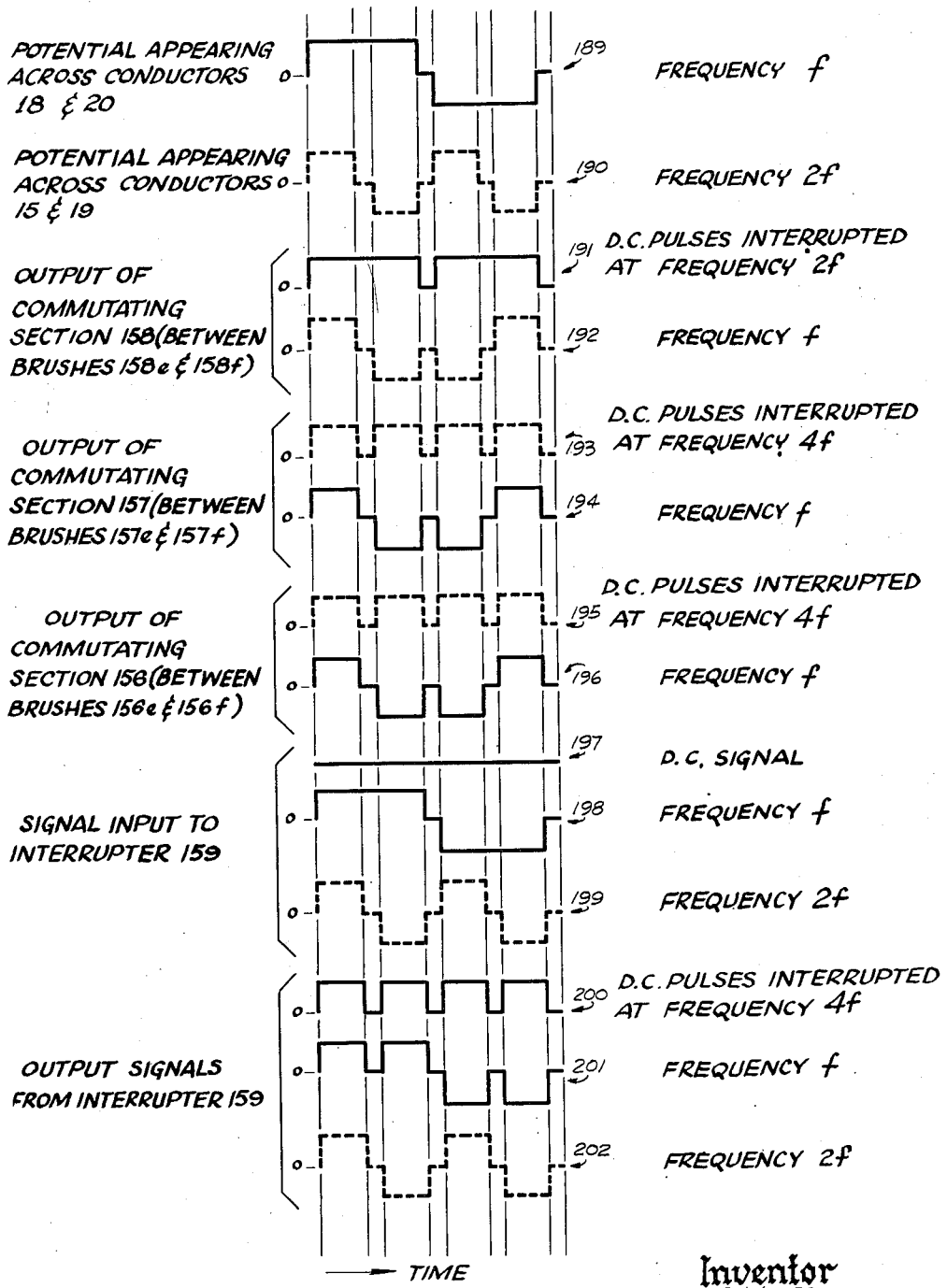

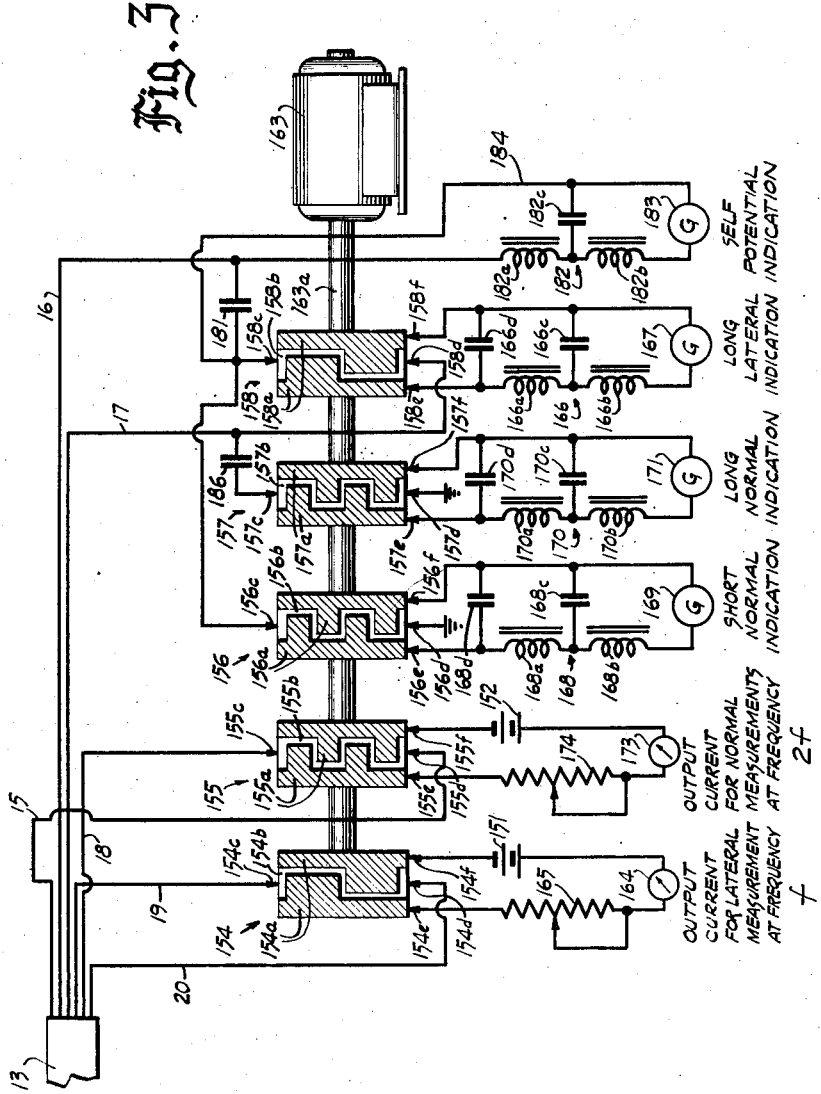

United States Patent Office 2,779,913
Patented Jan. 29, 1957

2,779,913

DUAL FREQUENCY WELL LOGGING SYSTEM

Henry C. Waters, Houston, Tex., assignor to Perforating Guns Atlas Corporation, Houston, Tex., a corporation of Delaware Application January 24, 1955, Serial No. 483,751

20 Claims. (Cl. 324—1)

This invention relates generally to an electrical system for logging wells and more particularly to a new and improved system for simultaneously obtaining a plurality of indications of the electrical characteristics of earth formations surrounding a borehole.

In logging wells by determining the resistivity of strata surrounding the well bore, it is customary simultaneously to obtain a plurality of resistivity curves, designated "normal" curves and "lateral" curves, each providing information particularly pertinent to one or more of the strata normally penetrated by the borehole. Thus, for example, the "normal" curves generally provide information concerning the location and resistivity of the various formations close to and adjacent the borehole. The "lateral" curves are useful primarily to determine the resistivity of formations at a greater distance from the borehole where the resistivity measurements are not influenced by the effects of the borehole and the borehole fluid. Both the normal and lateral curves have their limitations under certain conditions and are used to supplement each other when such conditions arise. The "normal" curves are produced by employing facilities comprising a pair of current electrodes spaced relatively far apart, and a potential electrode located near one of the current electrodes, the other potential electrode being remotely located. The "lateral" curves, on the other hand, result from the use of facilities including a pair of closely spaced current electrodes relatively close to one potential electrode, the other potential electrode being remotely located. In systems presently in use, these "normal" and "lateral" curves are obtained by investigation apparatus or downhole equipment, including the aforementioned spaced current and potential electrodes, which is raised and lowered within the borehole by means of a multi-conductor cable for connecting the current electrodes to energizing apparatus and for connecting the potential electrodes to indicating apparatus located at the earth's surface.

It has long been recognized that there are many different electrode spacings for producing these "normal" and "lateral" curves each possessing peculiar advantages and limitations with respect to particular non-homogeneous formations which may be encountered in a well bore. The various spacings, depending upon the relative distances between electrodes, are often referred to as "short," "intermediate" and "long" normal or lateral curves. Since it is virtually impossible to predict which types of curves will be best suited for investigating the formations surrounding any particular well bore, it is generally desirable to produce as many of the above described "normal" and "lateral" resistivity curves as possible as the investigation apparatus is lowered or raised within the borehole. In order to provide an optimum determination of the formations traversed by the borehole, it is also desirable to obtain, simultaneously with the various resistivity curves, an indication portraying variation in natural earth potential which may be termed a self-potential or spontaneous potential curve.

The number of resistivity curves obtained may be increased by providing a large number of potential or current electrodes in the downhole equipment while, at the same time, employing a corresponding number of conductors in the cable. It has long been recognized, however, that a large number of conductors in a cable introduces a number of attendant disadvantages in that such a cable is expensive, is subject to short circuiting and is inaccurate for depth measurements in a well due primarily to cable stretch as a result of its excessive weight. Accordingly, the use of additional conductors in the cable does not afford a practical solution to the problem of increasing the number of resistivity curves obtained during the log.

Other attempts to increase the number of resistivity curves obtained in a log have involved the use of two or more separately energized current electrodes in the downhole equipment to induce different effects upon the spaced potential electrodes. In systems of this character the potential electrodes are frequently susceptive to energy from more than one of the current electrodes, despite the separate energization of the latter, with the result that the potential electrodes are ordinarily incapable of distinguishing between the sources of this energy without employing extremely complicated measuring techniques in the sub-surface equipment. As a consequence, separation of the various currents appearing at the potential electrodes and identification of their respective sources has, until the present time, presented an exceedingly difficult problem.

Accordingly, one of the principal objects of the present invention is to provide a new and improved well logging system of the above character which obviates the described disadvantages of prior systems.

Another object of the present invention is to provide new and improved apparatus for accurately and simultaneously obtaining a large number of indications of earth resistivity and natural earth potential which is characterized by relatively simple, inexpensive construction.

A further object of the invention is to provide an electrical well logging system employing spaced current and potential electrodes in the borehole in which the several signals collected by each of the potential electrodes are easily separated and identified without requiring elaborate electronic filtering equipment or other devices of this character.

It is likewise an object of the invention to provide an electrical well logging system employing at least two spaced current electrodes for establishing alternating current fields of different frequency within formations adjacent the borehole in order to facilitate identification and separation of the energy appearing at one or more potential electrodes as a result of these fields.

Still another object of the present invention is to provide a system of the above character in which the alternating current to the current electrodes for creating the fields is established by a commutator which synchronizes the field alternations with the operation of indicating facilities at the earth's surface in order to translate the energy of the alternating fields into indications representative of the electrical characteristics of the formations adjacent the borehole.

The invention both as to its organization and method of operation, together with further objects and advantages thereof will best be understood by reference to the specification taken in conjunction with the accompanying drawings in which:

Fig. 1 diagrammatically illustrates an electrical well logging system characterized by the features of the present invention;

Fig. 2 shows a group of curves illustrating the time relationship between signals appearing at various points of the apparatus shown in Fig. 1; and Fig. 3 diagrammatically illustrates a portion of the apparatus shown in Fig. 1 depicting an alternative construction which may be employed.

Referring now to the drawings, and particularly to Fig. 1 thereof, the present invention is there illustrated as embodied in apparatus for electrically logging a well or borehole 10 in order to determine the characteristics of the earth formations 11 traversed by the borehole. It will be understood that the borehole 10 may contain drilling fluid with mud suspended therein which generally remains in the hole after the removal of the drilling equipment although such fluid has not been illustrated in the drawings.

Investigation apparatus or downhole equipment, indicated generally by the reference character 112, is carried upon a multi-conductor cable 13 whereby it may be raised and lowered within the borehole. To this end, the cable 13 is trained over a sheave 14 at the earth's surface and may be wound upon a suitable reel (not shown) in customary manner. The cable 13 is illustrated as comprising six electrical conductors, designated 15 to 20, inclusive, although it should be understood that the cable may actually include any desired number of conductors, the particular number selected being a function of the number of resistivity curves to be produced as will be apparent from the ensuing description. These conductors, as indicated above, terminate at one end in the investigation apparatus 112 and at the other end are connected to surface equipment designated generally by the reference character 150.

The investigation apparatus includes a housing 121 containing a plurality of spaced, electrically insulated electrodes, these being illustrated as six in number and being designated by the reference characters 122 to 127, inclusive, although any number of such electrodes may actually be employed as determined by the number of conductors in the cable 13. The outer surface of each of the electrodes is preferably exposed to the outside of the housing 121 in order to effect electrical contact through the borehole fluid with the earth formations 11 adjacent the well bore.

The pair of electrodes 122 and 126 and the pair of electrodes 124 and 127 are termed current electrodes by virtue of the fact that each pair induces a flow of current from their associated conductors through the formations adjacent the borehole in a manner to be described more fully hereinafter. The electrodes 123 and 125 are termed potential or probe electrodes since they function to measure potential differences existing between various points in the borehole formations as a result of the above-described current flow. Each of the four current electrodes and the two potential electrodes is connected by one of the conductors in the cable to a commutator 153 of the surface equipment 150. This commutator comprises a plurality of commutating sections 154 to 159, inclusive, which are rotated in synchronism due to the fact that they are mounted upon a common shaft 163a driven at any suitable and approximately constant speed by motor 163. The commutating section 154 functions to convert the direct current potential applied thereto from direct current source 151 to a square wave alternating current voltage having a frequency $f$, dependent upon the rate of rotation of the drive shaft 163a. Specifically, direct current source 151 is connected in series with a power or current measuring means 164 and a power adjusting rheostat 165 to input brushes 154e and 154f in continuous engagement with the two spaced conducting portions 154a of commutating section 154. In this manner, a difference of potential is continuously impressed across the two conducting portions of the latter commutating section, which difference of potential is converted to a square wave alternating current voltage appearing between conductors 18 and 20, respectively connected to diametrically opposed output brushes 154c and 154d. The square wave voltage appearing between conductors 18 and 20, which is illustrated by the solid line curve 189 in Fig. 2, is impressed across the current electrodes 124 and 127 spaced considerable distance apart in the downhole equipment 112. The remote current electrode 127 is preferably located at a sufficient distance from the potential measuring electrodes 123 and 125 that its effect upon the potential difference existing between these potential electrodes is extremely small, or is negligible in comparison to the effect of the current flowing from electrode 124. The square wave current flowing between electrodes 124 and 127 creates an electric field in the surrounding earth formations having a frequency $f$ with the result that a difference of potential of the same frequency exists between the potential measuring electrodes 123 and 125. The latter difference of potential is applied through conductors 16 and 17 to the commutator 153 at the earth's surface. Specifically, the electrode 123 is connected by conductor 16 through a direct current blocking condenser 181 to brush 158c in engagement with the periphery of commutating section 158, while the electrode 125 is connected through conductor 17 to brush 158d positioned on the opposite side of the commutating section 158. The alternate engagement of the brushes 158c and 158d by first one and then another of the conducting portions 158a effectively brings the input brushes 158c and 158d into electrical contact with first one and then another of output brushes 158e and 158f. The net effect of this reversal of connection between the input and output brushes of the commutating section 158 is to rectify the square wave signals collected by electrodes 123 and 125 and to provide unidirectional square wave signal pulses which are interrupted at a frequency $2f$ appearing between brushes 158e and 158f as illustrated by the curve 191 shown in Fig. 2. These unidirectional signals are applied through filter section 166, comprising inductors 166a and 166b and condensers 166c and 166d, to a recording indicator 167. The filter section 166 smoothes out the unidirectional signals applied thereto and produces a direct current signal for energizing the indicator 167 in order to produce a continuous three electrode resistivity measurement of the subterranean formations which is customarily referred to as a lateral curve.

In order to provide two additional two electrode resistivity curves simultaneously with the three electrode lateral curve just described, the commutating section 155 excites the potential electrodes with an additional square wave signal. To this end, commutating section 155 converts the D. C. current from direct current source 152 to a square wave A. C. voltage having a frequency of $2f$. Specifically, the direct current from source 152 is applied through a power or current measuring means 173 and through a power adjusting means 174 to input brushes 155e and 155f in continuous engagement with the conducting portions of commutating section 155. Diametrically opposed output brushes 155c and 155d are alternately engaged by the conducting and insulating portions of the commutating section 155 in order periodically to reverse the connection between input brushes 155e and 155f and the output brushes. The above-described reversal occurs at twice the rate of the reversal effected by commutating section 154 due to the difference in configuration between the conducting and insulating portions of commutating sections 154 and 155. Thus, there appears between conductors 15 and 19 a square wave alternating current potential having a frequency $2f$ which is applied across electrodes 122 and 126 of the downhole equipment and is illustrated by the dotted line wave 190 shown in Fig. 2. The electrode 126, like the electrode 127, is located at a remote distance from the potential measuring electrodes 123 and 125 whereby its effect upon the potential difference existing between the potential electrodes is extremely small. The current flowing between electrodes 122 and 126 creates an electric field in the surrounding earth formations having a frequency $2f$ which produces a potential difference between each of the two pairs of potential measuring electrodes comprised of subsurface electrode 123, ground electrode 172 and subsurface electrode 125 and a ground electrode 185 at the earth's surface. Thus, two A. C. potential differences, one having a frequency $f$ and the other having a frequency $2f$, appear between measuring electrode 123 and surface electrode 172 and are applied across input brushes 156c and 156d of commutating section 156 through the blocking condenser 181. Commutating section 156 functions to rectify the square wave input signals having a frequency $2f$ in order to produce between output brushes 156e and 156f unidirectional square wave signal pulses which are interrupted at a frequency $4f$ as shown by the wave 195 in Fig. 2. At the same time, rotation of commutating section 156 converts the input signal of frequency $f$ to a signal resembling the wave 196 illustrated in Fig. 2 and also having a frequency $f$. The unidirectional voltage developed by commutating section 156 is passed through filter section 168 to the recording indicator 169. The filter section 168 is designed to reject the signal of frequency $f$ represented by wave 196 and to smooth out the unidirectional signal represented by wave 195 in order to provide a D. C. signal for energizing the recording indicator 169, thereby to produce a continuous two electrode resistivity measurement which is referred to as a short normal curve.

The second two electrode resistivity curve is obtained by measuring the potential difference existing between the electrode 125 and surface electrode 185 as a result of the excitation signals having a frequency $2f$. Thus, the electrode 125 is connected to brush 157c through blocking condenser 186 while ground electrode 185 is connected directly to brush 157d with the result that two input signals, one having a frequency $f$ and one having a frequency $2f$, are applied across input brushes 157c and 157d. Commutating section 157 functions to rectify the voltage of frequency $2f$ applied between brushes 157c and 157d in order to provide between brushes 157e and 157f unidirectional square wave signal pulses which are interrupted at a frequency $4f$ as illustrated by the dotted line curve 193 shown in Fig. 2. This unidirectional signal is passed through filter section 170 where it is smoothed out and applied to recording indicator 171 in order to provide a continuous two electrode resistivity measurement referred to as a long normal curve. The input signal of frequency $f$ applied to commutating section 157 is converted, in the manner described above, to a wave resembling the wave 194 in Fig. 2 having a frequency $f$ which is rejected by filter section 170 in order to insure that indicator 171 responds solely to the input signals of frequency $2f$.

As indicated above, the D. C. natural earth potentials are prevented from entering the commutating sections 156, 157, and 158 by the direct current blocking condensers 181 and 186 but these direct current signals are passed through commutating section or rotary interrupter 159, which cooperates with filter section 182 and recording indicator 183 to provide a self potential or natural earth potential curve simultaneously with the three resistivity curves described above. Specifically, the direct current signals appearing between the electrode 123 and ground electrode 187 are applied through conductor 16 to input brush 159c of the rotary interrupter 159. Thus, the input to rotary interrupter 159 comprises three signals, one being a direct current signal represented by the wave 197 shown in Fig. 2, a second being an A. C. square wave having a frequency $f$ represented by the wave 198, and the third being an A. C. square wave of frequency $2f$ represented by wave 199. The alternate engagement of output brush 159d with the conducting portion 159a of the rotary interrupter in time correlation with the current reversals effected by commutating sections 154 and 155 transforms the D. C. signal into unidirectional square wave pulses which are interrupted at a frequency $4f$ as shown by the wave 200 in Fig. 2, converts the A. C. input signal of frequency $f$ to an output resembling wave 201 and having a frequency $f$, and passes the input signal of frequency $2f$ without alteration as illustrated by wave 202. Output brush 159 applies all three of the signals represented by waves 200, 201 and 202 to the filter section 182 which functions to reject the A. C. signals having frequencies of $f$ and $2f$ and to smooth out the unidirectional signal pulses of frequency $4f$ in order to produce a D. C. signal for application to the recording indicator 183, thereby to provide the desired self potential measurement. The electrical connection between input brush 159c and output brush 159d is periodically interrupted by the commutating section 159 in order to disconnect the self potential recording indicator 183 from its associated cable conductor during transient periods caused by reversal of current flow through conductors 15, 18, 19 and 20 as a result of the operation of commutating sections 154 and 155. In the event that these transient currents do not prove to be objectionable or can be filtered out satisfactorily by filter section 182, rotary interrupter 159 may be eliminated in which case the signals of frequency $f$ and $2f$ will be rejected by filter section 182 while the D. C. signal represented by wave 197 in Fig. 2 will be passed directly to recording indicator 183.

Referring now to the operation of the well logging system illustrated in Fig. 1, it will be observed that as the investigation apparatus 112 is moved to different depths within the borehole 10, the motor 163 is placed in operation to drive synchronously all of the commutating sections 154 to 159, inclusive, at an approximately constant speed. Commutating section 154 cooperates with direct current source 151 to provide a square wave alternating current potential of frequency $f$ for application through cable conductors 18 and 20 to electrodes 124 and 127. At the same time, commutating section 155 cooperates with direct current source 152 to provide square wave alternating current excitation signals having a frequency $2f$ for application through cable conductors 15 and 19 to electrodes 122 and 126. The potential measuring electrodes 123 and 125 are used as probe electrodes for sampling the intensity of the electric fields established in the surrounding formations. Signals indicative of the field intensities are applied through cable conductors 16 and 17 to commutating sections 156, 157, and 158. Thus, across the input brushes of each of these three commutating sections there appears a square wave having a frequency $f$ and a second square wave having a frequency $2f$ produced by the two alternating currents from commutating sections 154 and 155 in the manner described above. As previously indicated, these two input signals have wave shapes resembling the curves 189 and 190 shown in Fig. 2. It is desirable to measure one of these two signals in each of the measuring circuits and to reject the other signal. To this end, the commutating sections 156 and 157 are both driven in time correlation with commutating section 155 with the result that the signals of frequency $2f$ applied across their input brushes are rectified in order to produce unidirectional signals, illustrated by the waves 193 and 195 in Fig. 2, which are respectively smoothed by filter sections 168 and 170 and are then recorded by the recording indicators 169 and 171. The undesired input signals applied to the commutating sections 156 and 157, each having a frequency $f$, are not rectified but emerge as square waves having a frequency $(2f-f)$ or $f$, as illustrated by waves 194 and 196 in Fig. 2. The filter sections 168 and 170 function to reject the undesired alternating current signals appearing across the output brushes of the commutating sections 156 and 157 and also function to smooth out the unidirectional signals appearing across these brushes in order to produce direct current signals which are respectively recorded by the indicators 167 and 169. The latter indicators provide continuous two electrode resistivity measurements of the earth formations 11.

The commutating section 158, which, like the commutating sections 156 and 157, is excited by input signals having frequencies $f$ and $2f$ appearing across input brushes 158c and 158d, functions to rectify the signal having a frequency $f$ to produce a unidirectional voltage across output brushes 158e and 158f, as illustrated by the wave 191 in Fig. 2, and to produce an alternating current signal having a frequency $f$ from the excitation signal having a frequency $2f$, as illustrated by the wave 192. The filter section 166 rejects the alternating current square wave signal of frequency $f$ and converts the unidirectional signal to a D. C. signal for application to the recording galvanometer 167 in order to provide a three electrode resistivity indication in the manner described above. Thus, the commutating sections 156, 157, and 158 and their associated indicating circuits function continuously in order to provide three simultaneous resistivity measurements. At the same time, the rotary interrupter 159 cooperates with the indicator 183 and filter 182 to provide the self potential measurement. The signals applied to the rotary interrupter contain not only the desired direct current potentials but in addition the alternating current signals having frequencies of $f$ and $2f$. The two alternating current signals are passed by the interrupter to the filter 182 along with a unidirectional signal representative of the direct current signals. The filter 182 functions to reject both of the alternating current signals and to smooth out and pass the unidirectional signals to the indicator 183.

It should be understood that the positional arrangement of the current and potential electrodes shown in Fig. 1 is merely illustrative and that, accordingly, other arrangements can be devised which will afford entirely satisfactory results. Thus, for example, the brushes 156d and 157d may be connected together to the remote electrode 126 in the downhole equipment while at the same time connecting brush 154d to one of the ground electrodes. Moreover, if desired, the self potential indicating apparatus 183 may be connected in series with its associated filter section 182 across blocking condenser 181 as illustrated in Fig. 3, thereby eliminating the rotary interrupter 159. Specifically, in the apparatus shown in Fig. 3, conductor 16 is connected directly to the input of filter section 182 which functions to reject the two A. C. square wave signals having frequencies of $f$ and $2f$, respectively, and to pass the D. C. signals to one side of the indicator 183. Connector 184 leading from the other side of the indicator is connected to brush 156c and through commutating section 156 to ground electrode 172 during certain intervals of operation. Since the commutating section 156 breaks the electrical circuit between connector 184 and ground during all of the periods of current reversal effected by commutating sections 154 and 155, it will be evident that the deleterious effects of transients during such reversals are avoided. Thus, by connecting the self potential indicating apparatus in series with one of the resistivity measuring circuits as shown in Fig. 3, the rotary interrupter may be eliminated without effecting the self potential curve produced by indicator 183.

From the foregoing explanation, it will be apparent that the use of excitation signals of different frequencies together with indicating equipment operated in synchronism with the sources of these excitation signals facilitates the simultaneous production of a plurality of resistivity curves from the same potential electrodes without inducing interaction between the signals from the two current sources. Thus, the signals sampled by the potential measuring electrodes may be easily separated and applied to the proper indicating device, thereby providing a plurality of different resistivity curves from which the subterranean formations may be analyzed.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. Apparatus for electrically logging oil wells or the like to determine the electrical characteristics of earth formations adjacent a borehole comprising, in combination; a cable having a plurality of conductors; equipment mounted on said cable to be lowered into the borehole thereby, said equipment including at least two longitudinally spaced apart probe electrodes and a plurality of current electrodes longitudinally spaced from each other and spaced different distances from the probe electrodes; means including a source of current for energizing at least one of said current electrodes in order to create a first alternating current field in said earth formations; means for energizing another of said current electrodes in order to create in said formations a second alternating current field having a frequency different from that of said first field; and a pair of measuring systems at the earth's surface individually connected by other conductors in said cable to said probe electrodes for separating the signals present at said probe electrodes and providing separate indications of the effect of each of said alternating current fields upon the probe electrodes thereby to measure different electrical characteristics of said formations.

2. Apparatus for electrically logging oil wells or the like to determine the electrical characteristics of earth formations adjacent a borehole comprising, in combination; a cable having a plurality of conductors; equipment mounted on said cable to be lowered into the borehole thereby, said equipment including at least two longitudinally spaced apart probe electrodes and a plurality of current electrodes longitudinally spaced from each other and differently spaced with respect to said probe electrodes; means including a source of current for energizing at least one of said current electrodes in order to create a first alternating current field in said earth formations; means energizing another of said current electrodes in order to create in said formations a second alternating current field having a frequency different from that of said first field; a pair of measuring systems each connected to a different one of said probe electrodes and to a remote reference point for separating the signals present at said probe electrodes and providing indications representative of the effect of said first alternating current field upon each of said probe electrodes, thereby to provide a pair of measurements of the characteristics of said formations; and a third measuring system connected to both of said probe electrodes for indicating the potential difference between said probe electrodes caused by said second alternating current field, thereby to provide a third measurement of the resistivity of said formations.

3. Apparatus for electrically logging oil wells or the like to determine the electrical characteristics of earth formations adjacent a borehole comprising, in combination; a cable having a plurality of conductors; equipment mounted on said cable to be lowered into the borehole thereby, said equipment including at least two longitudinally spaced apart probe electrodes and a plurality of current electrodes longitudinally spaced from each other and differently spaced with respect to said probe electrodes; means including a source of current for energizing at least one of said current electrodes in order to create a first alternating current field in said earth formations; means for energizing another of said current electrodes in order to create in said formations a second alternating current field having a frequency different from that of said first field; a pair of measuring systems respectively connected by a first and a second of said conductors to said probe electrodes and each connected to a reference point located remotely from all of said electrodes for separating the signals present at said probe electrodes and providing a pair of indications representative of the difference of potential between each of said probe electrodes and a reference point as a result of said first alternating current field, thereby to provide first and second measurements of the resistivity of said formations; and a third measuring system connected by said first and second conductors to both of said probe electrodes for indicating the potential difference between said probe electrodes caused by said second alternating current field, thereby to provide a third measurement of the resistivity of said formations.

4. In an apparatus for electrically logging oil wells or the like to determine the electrical characteristics of earth formations adjacent a borehole the combination of; a cable having a plurality of conductors; equipment mounted on said cable to be lowered into the borehole thereby, said equipment including at least two longitudinally spaced apart probe electrodes and a plurality of current electrodes longitudinally spaced from each other and differently spaced with respect to said probe electrodes; means including a source of current for energizing at least one of said current electrodes in order to create a first alternating current field in said earth formations; means for energizing another of said current electrodes in order to create in said formations a second alternating current field having a frequency different from that of said first field; a pair of measuring systems at the earth's surface individually connected by other conductors in said cable to said probe electrodes for separating the signals present at said probe electrodes and providing separate indications of the effect of each of said alternating current fields upon the probe electrodes thereby to provide at least two different measurements of the characteristics of said formations; a signal transmitting system including one of said potential electrodes for transmitting direct current signals through one of the conductors in said cable to the earth's surface; and indicating means responsive to said direct current signals for providing an indication of the natural earth potential.

5. Apparatus for electrically logging oil wells or the like to determine the electrical characteristics of formations adjacent the borehole comprising, in combination; a cable having a plurality of conductors; equipment mounted on said cable to be lowered into the borehole, said equipment including a pair of spaced apart probe electrodes and a plurality of spaced apart current electrodes; a commutator having a plurality of commutating sections located at the earth's surface; means including a source of current and a first of said commutating sections connected by a cable conductor to at least one of said current electrodes for creating a first alternating current field in the formations adjacent the borehole; means including a second of said commutating sections connected to another of said current electrodes for creating a second alternating current field having a frequency different from that of said first field; means including conductors in said cable individually connecting said probe electrodes to a third and a fourth of said commutating sections for separating the signals present at said probe electrodes and measuring the effect of the first alternating current field on each of said probe electrodes, thereby to provide at least two distinct indications of the characteristics of the earth formations; and means including conductors connecting a fifth of said commutating sections to both of said probe electrodes for measuring the potential difference between said probe electrodes caused by said second alternating current field, thereby to provide a third indication of the resistivity of said earth formations.

6. Apparatus for electrically logging oil wells or the like to determine the electrical characteristics of formations adjacent the borehole comprising, in combination; a cable having a plurality of conductors; equipment mounted on said cable to be lowered into the borehole thereby, said equipment including a pair of longitudinally spaced apart probe electrodes and a plurality of current electrodes longitudinally spaced from each other and differently spaced with respect to said probe electrodes; a commutator having a plurality of commutating sections located at the earth's surface; means including a source of current and a first of said commutating sections connected by a first cable conductor to at least one of said current electrodes for creating a first alternating current field in the formations adjacent the borehole; means including a second of said commutating sections connected by a second cable conductor to another of said current electrodes for creating a second alternating current field having a frequency different from that of said first field; means including conductors in said cable individually connecting said probe electrodes to a third and a fourth of said commutating sections for separating the signals present at said probe electrodes and measuring the effect of the first alternating current field on each of said probe electrodes, thereby to provide at least two distinct indications of the resistivity of the earth formations; means including said third and fourth conductors connecting a fifth of said commutating sections to both of said probe electrodes for measuring the potential difference between said probe electrodes caused by said second alternating current field, thereby to provide a third indication of the resistivity of said earth formations; a signal transmitting system including one of said potential electrodes for transmitting direct current signals through one of the conductors in said cable to the earth's surface; and indicating means responsive to said direct current signals for providing an indication of the natural earth potential.

7. In an apparatus for electrically logging oil wells or the like to determine the electrical characteristics of earth formations adjacent a borehole the combination of; a cable having a plurality of conductors; equipment mounted on said cable to be lowered into the borehole thereby, said equipment including at least two longitudinally spaced apart probe electrodes and a plurality of current electrodes longitudinally spaced from each other and differently spaced with respect to said probe electrodes; means including a source of current for energizing at least one of said current electrodes in order to create a first alternating current field having a first frequency in said earth formations; means for energizing another of said current electrodes in order to create in said formations a second alternating current field having a second frequency which is an integral multiple of said first frequency; and a pair of measuring systems at the earth's surface individually connected by other conductors in said cable to said probe electrodes for separating the signals present at said probe electrodes and providing separate indications of the effect of each of said alternating current fields upon the probe electrodes thereby to provide at least two different measurements of the electrical characteristics of said formations.

8. In an apparatus for electrically logging oil wells or the like to determine the electrical characteristics of earth formations adjacent a borehole the combination of; a cable having a plurality of conductors; equipment mounted on said cable to be lowered into the borehole thereby, said equipment including at least two longitudinally spaced apart probe electrodes and a plurality of current electrodes longitudinally spaced from each other and differently spaced with respect to said probe electrodes; means including a source of current for energizing at least one of said current electrodes with a first rectangular wave signal having a first frequency in order to create in said earth formations a first alternating current field having said first frequency; means synchronized with the energization of said one current electrode for energizing another of said current electrodes with a second rectangular wave signal having a second frequency which is related to said first frequency by an integral multiple in order to create in said formations a second alternating current field having said second frequency; and a pair of measuring systems at the earth's surface individually connected by other conductors in said cable to said probe electrodes for separating the signals present at said probe electrodes and providing separate indications of the effect of each of said alternating current fields upon the probe electrodes thereby to provide at least two different measurements of the resistivity of said formations.

9. Apparatus for electrically logging oil wells or the like by determining the electrical characteristics of formations adjacent the borehole comprising, in combination; a cable having a plurality of conductors; equipment mounted on said cable to be lowered into the borehole thereby, said equipment including a pair of longitudinally spaced apart probe electrodes and a plurality of current electrodes longitudinally spaced from each other and differently spaced with respect to said probe electrodes; each of said electrodes being connected to a different one of the conductors in said cable; a commutator having a plurality of commutating sections located at the earth's surface; means including a source of current and a first of said commutating sections connected by a cable conductor to at least one of said current electrodes for creating a first alternating current field in the formations adjacent the borehole; means including a second of said commutating sections connected to another of said current electrodes for creating in said formations a second alternating current field having a frequency different from that of said first field frequency; means including an indicator and a third of said commutating sections for measuring the difference of potential between said probe electrodes caused by the first alternating current field, thereby to provide a first indication of the resistivity of the earth formations; means including a fourth of said commutating sections and one of said probe electrodes for measuring the difference of potential between said one probe electrode and a remote reference point as a result of the second alternating current field in order to provide a second indication of the resistivity of said earth formations; and means including a fifth of said commutating sections and the other of said pair of probe electrodes for measuring the difference of potential between said other probe electrode and a remote reference point as a result of the second alternating current field in order to provide a third indication of the resistivity of said earth formations.

10. Apparatus for electrically logging oil wells or the like by determining the electrical characteristics of formations adjacent the borehole comprising, in combination; a cable having a plurality of conductors; equipment mounted on said cable to be lowered into the borehole, said equipment including a pair of longitudinally spaced apart probe electrodes and a plurality of current electrodes longitudinally spaced from each other and differently spaced with respect to said probe electrodes; each of said electrodes being connected to a different one of the conductors in said cable; a commutator having a plurality of commutating sections located at the earth's surface; means including a source of current and a first of said commutating sections connected by a cable conductor to at least one of said current electrodes for creating at first alternating current field in the formations adjacent the borehole; means including a second of said commutating sections connected to another of said current electrodes for creating in said formations a second alternating current field having a frequency which is related to the frequency of the first field by an integral multiple; means including an indicator and a third of said commutating sections for measuring the difference of potential between said probe electrodes caused by the first alternating field, thereby to provide a first indication of the resistivity of the earth formations; means including a fourth of said commutating sections and one of said probe electrodes for measuring the difference of potential between said one probe electrode and a remote reference point as a result of the second alternating current field in order to provide a second indication of the resistivity of said earth formations; means including a fifth of said commutating sections and the other of said probe electrodes for measuring the difference of potential between said other probe electrode and a remote reference point as a result of the second alternating current field in order to provide a third indication of the resistivity of said earth formations; a signal transmitting system including one of said probe electrodes for transmitting direct current signals through one of the conductors in said cable to the earth's surface; and indicating means responsive to said direct current signals for providing an indication of the natural earth potential.

11. Apparatus for electrically logging oil wells or the like by determining the electrical characteristics of formations adjacent the borehole comprising, in combination; a cable having a plurality of conductors; equipment mounted on said cable to be lowered into the borehole, said equipment including a pair of longitudinally spaced apart probe electrodes and first and second pairs of current electrodes longitudinally spaced from each other and differently spaced with respect to said probe electrodes; each of said electrodes being connected to a different one of the conductors in said cable; a commutator having a plurality of commutating sections located at the earth's surface; means including a source of current, a first of said commutating sections and the first pair of said current electrodes for creating a first alternating current field in said formations; means including a second of said commutating sections and the second pair of current electrodes for creating in said formations a second alternating current field having a frequency different from that of the first field; means including an indicator and a third of said commutating sections for measuring the difference of potential between said probe electrodes caused by the first alternating current field, thereby to provide a lateral indication of the resistivity of the earth formations; means including a fourth of said commutating sections and at least one of said probe electrodes for measuring the difference of potential between said one probe electrode and a remote reference point as a result of the second alternating current field in order to provide a first normal indication of the resistivity of said earth formations; and means including a fifth of said commutating sections and the other of said pair of probe electrodes for measuring the difference of potential between said other probe electrode and a remote reference point as a result of the second alternating current field in order to provide a second normal indication of the resistivity of said earth formations.

12. Apparatus for electrically logging oil wells or the like by determining the electrical characteristics of formations adjacent the borehole comprising, in combination; a cable having a plurality of conductors; equipment mounted on said cable to be lowered into the borehole, said equipment including a pair of probe electrodes and first and second pairs of current electrodes longitudinally spaced from each other and differently spaced with respect to said probe electrodes; each of said electrodes being connected to a different one of the conductors in said cable; a commutator having a plurality of commutating sections located at the earth's surface; means including a source of current, a first of said commutating sections, and the first pair of current electrodes for creating a first alternating current field in the formations adjacent the borehole; means including a second of said commutating sections and the second pair of current electrodes for creating in said formations a second alternating current field having a frequency with is different from that of the first field; means including an indicator and a third of said commutating sections for measuring the difference of potential between said probe electrodes caused by the first alternating current field, thereby to provide a lateral indication of the resistivity of the earth formations; means including a fourth of said commutating sections and at least one of said probe electrodes for measuring the difference of potential between said one probe electrode and a remote reference point as a result of the second alternating current field in order to provide a first normal indication of the resistivity of said earth formations; means including a fifth of said commutating sections and the other of said pair of probe electrodes for measuring the difference of potential between said other probe electrode and a remote reference point as a result of the second alternating current field in order to provide a second normal indication of the resistivity of said earth formations; a signal transmitting system including one of said probe electrodes for transmitting direct current signals through one of the conductors in said cable to the earth's surface; and indicating means responsive to said direct current signals for providing an indication of the natural earth potential.

13. In an apparatus for electrically logging oil wells or the like to determine the electrical characteristics of earth formations adjacent a borehole, the combination of; a cable having a plurality of conductors; equipment mounted on said cable to be lowered into the borehole, said equipment including at least two longitudinally spaced apart probe electrodes and first and second pairs of current electrodes longitudinally spaced from each other and differently spaced with respect to said probe electrodes; means including a source of current for energizing the first pair of said current electrodes in order to create a first alternating current field in said earth formations; means for energizing the second pair of said current electrodes in order to create in said formations a second alternating current field having a frequency which is different from that of the first field; a pair of measuring systems at the earth's surface individually connected by other conductors in said cable to said probe electrodes for separating the signals present at said probe electrodes and providing separate indications of the effect of each of said alternating current fields upon the probe electrodes thereby to provide at least two different measurements of the resistivity of said formations; a signal transmitting system including one of said probe electrodes for transmitting signals indicative of the natural earth potentials to the surface equipment; and indicating means responsive to said signals for providing an indication of the natural earth potentials.

14. In an apparatus for electrically logging oil wells or the like to determine the electrical characteristics of earth formations adjacent a borehole the combination of; a cable having a plurality of conductors; equipment mounted on said cable to be lowered into the borehole thereby, said equipment including at least two longitudinally spaced apart probe electrodes and a plurality of current electrodes longitudinally spaced from each other and differently spaced with respect to said probe electrodes; means including a source of current for energizing at least one of said current electrodes with a first rectangular wave signal having a first frequency in order to create in said earth formations a first alternating current field having said first frequency; means synchronized with the energization of said one current electrode for energizing another of said current electrodes with a second rectangular wave signal having a second frequency which is an integral multiple of said first frequency in order to create in said formations a second alternating current field having said second frequency; a pair of measuring systems at the earth's surface individually connected by conductors in said cable to said probe electrodes for separating the signals present at said probe electrodes and providing separate indications of the effect of each said alternating current fields upon the probe electrodes thereby to provide at least two different measurements of the resistivity of said formations; a signal transmitting system including one of said probe electrodes for transmitting signals indicative of the natural earth potentials to the surface equipment; and indicating means responsive to the last named signals for providing an indication of the natural earth potentials.

15. In an apparatus for electrically logging oil wells or the like to determine the electrical characteristics of earth formations adjacent a borehole the combination of; a cable to be lowered into the borehole thereby, said equipment including at least two longitudinally spaced apart probe electrodes and first and second pairs of current electrodes longitudinally spaced from each other and differently spaced with respect to said probe electrodes; means including a source of current for energizing the first pair of said current electrodes in order to create a first alternating current field in said earth formations; means for energizing the second pair of said current electrodes in order to create in said formations a second alternating current field having a frequency which is different from that of the first field; and a pair of measuring systems at the earth's surface individually connected by other conductors in said cable to said probe electrodes for separating the signals present at said probe electrodes and providing separate indications of the effect of each of said alternating current fields upon the probe electrodes, thereby to provide at least two different measurements of the resistivity of said formations.

16. In an electrical system for making a plurality of resistivity logs having different electrode spacings and representative of the electrical characteristics of earth formations adjacent a borehole, the combination of a cable having a plurality of conductors; equipment mounted on said cable to be lowered into the borehole, said equipment including a plurality of longitudinally spaced apart electrodes individually connected to said conductors, said electrodes including a pair of potential measuring electrodes and first and second pairs of current electrodes having different longitudinal spacings with respect to said potential measuring electrodes; two sources of alternating current having frequencies related to each other by an integral multiple and located at the surface of the earth, the first of said sources being connected through a pair of current conductors in said cable to said first pair of current electrodes in order to establish a first alternating current field in the borehole formations and the second of said sources being connected through another pair of current conductors in said cable to said second pair of current electrodes in order to establish a second alternating current field in the borehole formations having a frequency related to said first field by said integral multiple, means including a first selective measuring and indicating system at the surface for measuring the difference of potential between said potential electrodes caused by the first of said alternating current fields and for rejecting the signal caused by the second of said alternating current fields; means including a second selective measuring and indicating system at the earth's surface for measuring a second difference of potential caused by the second of said alternating current fields and existing between one of said potential electrodes and a remote reference point while at the same time rejecting the potential difference caused by the first alternating current field; and means including a third measuring and indicating system at the earth's surface for measuring a third difference of potential existing between the other of said potential measuring electrodes and a remote reference point as a result of said second alternating current field while at the same time rejecting the signals created by the first alternating current field.

17. In an electrical system for making simultaneously a natural potential log and a plurality of resistivity logs, the combination of a cable having a plurality of conductors; equipment mounted on said cable to be lowered into the borehole, said equipment including a plurality of longitudinally spaced apart electrodes individually connected to said conductors, said electrodes including a pair of potential measuring electrodes and first and second pairs of current electrodes having different longitudinal spacings with respect to said potential measuring electrodes; two sources of alternating current having frequencies related to each other by an integral multiple and located at the surface of the earth, the first of said sources being connected through a pair of current conductors in said cable to said first pair of current electrodes in order to establish a first alternating current field in the borehole formations and the second of said sources being connected through another pair of current conductors in said cable to said second pair of current electrodes in order to establish a second alternating current field in the borehole formations having a frequency related to said first field by said integral multiple, means including a first selective measuring and indicating system at the surface for measuring the difference of potential between said potential electrodes caused by the first of said alternating current fields and for rejecting the signal caused by the second of said alternating current fields; means including a second selective measuring and indicating system at the earth's surface for measuring a second difference of potential caused by the second of said alternating current fields and existing between one of said potential electrodes and a remote reference point while at the same time rejecting the potential difference caused by the first alternating current field; means including a third measuring and indicating system at the earth's surface for measuring a third difference of potential existing between the other of said potential measuring electrodes and a remote reference point as a result of said second alternating current field while at the same time rejecting the signals created by the first alternating current field; a signal transmitting system including one of said potential electrodes for transmitting direct current signals through one of the conductors in said cable to the earth's surface; and indicating means responsive to said direct current signals for providing an indication of the natural earth potential.

18. Apparatus for electrically logging oil wells or the like to determine the electrical characteristics of earth formations adjacent a borehole comprising in combination a cable having a plurality of conductors; equipment mounted on said cable to be lowered into the borehole, said equipment including at least two longitudinally spaced apart probe electrodes and a plurality of current electrodes longitudinally spaced from each other and spaced differently with respect to the probe electrodes; means including a source of current for energizing at least one of said probe electrodes in order to create a first alternating current field in said earth formations; means for energizing another of said current electrodes in order to create in said formations a second alternating current field having a frequency different from that of said first field; a first indicating system at the earth's surface connected with at least one of the probe electrodes and including means for rendering said first indicating system alternately effective in synchronism with the alternations in said first alternating current field in order to separate the signals present at said one probe electrode and permit the first indicating system to measure a first electrical characteristic resulting solely from said first alternating current field; and a second indicating system connected with the other probe electrode and including means for rendering said second indicating system alternately effective in synchronism with the alternations in said second alternating current field in order to separate the signals present at said other probe electrode and permit the second indicating system to measure an electrical characteristic resulting solely from the effect of said second alternating current field on said other probe electrode.

19. Apparatus for electrically logging oil wells or the like to determine the electrical characteristics of earth formations adjacent a borehole comprising in combination a cable having a plurality of conductors; equipment mounted on said cable to be lowered into the borehole, said equipment including at least two longitudinally spaced apart probe electrodes and a plurality of current electrodes longitudinally spaced from each other and spaced differently with respect to the probe electrodes; means including a source of current for energizing at least one of said probe electrodes in order to create a first alternating current field in said earth formations; means for energizing another of said current electrodes in order to create in said formations a second alternating current field having a frequency different from that of said first field; first and second measuring systems at the earth's surface individually connected by cable conductors to said probe electrodes and including means for rendering said first and second measuring systems effective and ineffective in synchronism with the alternations in said first alternating current field in order to separate the signals present at said probe electrodes and permit the first and second measuring systems to measure different electrical characteristics resulting from the effect of the first alternating current field upon each of said probe electrodes; and a third measuring system connected by a pair of cable conductors to both of said probe electrodes and including means for rendering said third measuring system alternately effective in synchronism with the alternations in said second alternating current field in order to separate the signals present at said probe electrodes and permit the third measuring system to provide a measurement of the potential difference existing between said probe electrodes as a result of said second alternating current field.

20. Apparatus for electrically logging oil wells or the like to determine the electrical characteristics of earth formations adjacent a borehole comprising, in combination; a cable having a plurality of conductors; equipment mounted on said cable to be lowered into the borehole thereby, said equipment including two spaced apart probe electrodes and a plurality of spaced apart current electrodes; means including a source of current for energizing at least one of said current electrodes in order to create a first alternating current field in said earth formations; means for energizing another of said current electrodes in order to create in said formations a second alternating current field having a frequency different from that of said first field; and a pair of measuring systems at the earth's surface individually connected by other conductors in said cable to said probe electrodes for separating the signals present at said probe electrodes and providing separate indications of the effect of each of said alternating current fields upon the probe electrodes thereby to measure different electrical characteristics of said formations.

References Cited in the file of this patent

UNITED STATES PATENTS

| | | |
|---|---|---|
| 2,357,177 | Doll | Aug. 29, 1944 |
| 2,398,761 | Aiken | Apr. 23, 1946 |
| 2,436,563 | Fresch | Feb. 24, 1948 |
| 2,573,133 | Greer | Oct. 30, 1951 |